United States Patent [19]
Martell

[11] Patent Number: 5,004,053
[45] Date of Patent: Apr. 2, 1991

[54] MULTIPLE USE CULTIVATING TOOL

[76] Inventor: Gregg Martell, 8644 Cavel St., Downey, Calif. 90242

[21] Appl. No.: 418,552

[22] Filed: Oct. 10, 1989

[51] Int. Cl.⁵ ............................................. A01B 1/20
[52] U.S. Cl. ................................. 172/375; 172/380; 56/400.04; 56/400.06
[58] Field of Search ............... 172/371, 372, 375, 378, 172/380; 56/400.01, 400.04, 400.05, 440.06, 400.16; 294/51, 52; D8/6

[56]         References Cited
          U.S. PATENT DOCUMENTS

| D. 230,247 | 2/1974 | Parry | 172/375 X |
|---|---|---|---|
| 1,192,097 | 7/1916 | Nelson | 56/400.05 X |
| 2,080,763 | 5/1937 | Cox | 56/400.05 X |
| 2,726,504 | 12/1955 | Paluska | 56/400.05 |
| 2,795,923 | 6/1957 | Kapuczin | 56/400.05 |
| 4,169,509 | 10/1979 | Lowman | 172/375 |
| 4,476,939 | 10/1984 | Wallace | 294/51 X |
| 4,730,679 | 3/1988 | Tallerico et al. | 172/378 X |

FOREIGN PATENT DOCUMENTS 247931  1/1948  Switzerland .................... 56/400.06

Primary Examiner—Randolph A. Reese
Assistant Examiner—Jeffrey L. Thompson
Attorney, Agent, or Firm—Roy A. Ekstrand

[57] ABSTRACT

A multiple use cultivating tool includes a generally planar rigid blade support defining a plurality of outwardly extending cultivating members and a lower tamping surface. A generally triangular pick blade and a plurality of pointed rake teeth extend outwardly from the blade support in generally perpendicular directions. A straight blade is formed on a portion of the blade support and extends outwardly to form an additional cultivating member. A generally cylindrical handle support is secured to the blade support and extends orthogonally therefrom. An elongated rigid handle is secured within the handle support.

9 Claims, 2 Drawing Sheets

MULTIPLE USE CULTIVATING TOOL

FIELD OF THE INVENTION

This invention relates generally to cultivating tools and particularly to those operated manually.

BACKGROUND OF THE INVENTION

The cultivating of soil has been carried on throughout most of recorded history and continues through the present day. Soil is cultivated for a variety of reasons including the growing of plants for food, the participation in gardening as a hobby, and for aesthetic purposes such as landscaping or the like. Regardless of the purpose for cultivating soil, the complete operation in most instances requires a variety of tools to achieve the desired soil conditions and manipulation. While a number of power assisted or power operated cultivating tools have been created through the years, a substantial amount of soil cultivation is nonetheless still carried on by hand.

Perhaps the most popular hand cultivating tools include rakes, hoes, picks and shovels. While rakes come in a variety of forms, they typically include an elongated handle having a laterally disposed cross member which in turns supports a plurality of tines often arranged in parallel array. The function of a rake is generally to provide combing or smoothing of the soil. Rakes are also used to cultivate or loosen the soil to a desired depth. A hoe is generally similar to a rake in that it includes an elongated handle. However, a hoe usually comprises a planar blade supported transverse to the handle which is often used in short chopping motions to break up or till the soil. A pick, in its most common form, includes an elongated handle similar to that of an ax or the like having at least one elongated generally curved and sharpened or pointed blade extending transversely from the handle. The pick is generally used in chopping or swinging motions to drive the blade deep into the soil and permit the soil to be broken up or loosened. Shovels exist in a variety of forms and generally comprise an elongated handle having a digging blade often having a curved or pointed shovel edge.

While such tools provide substantial benefit in cultivating soil and work very satisfactorily in most instances, their use in various combinations to cultivate soil is often inconvenient in that a great variety of tools must be carried to and from the work location and must be carefully placed away from the work area to avoid injury to the worker. In addition, substantial time is often lost in switching among such an array of cultivating tools.

There remains, therefore, a need in the art for an improved cultivating tool which provides a compact, easy to use and effective multiple use capability without the need of utilizing an array of individual tools.

SUMMARY OF THE INVENTION

Accordingly, it is a general object of the present invention to provide an improved cultivating tool. It is a more particular object of the present invention to provide an improved multiple use cultivating tool. It is a still more particular object of the present invention to provide an improved multiple use cultivating tool which replaces a substantial array of individual cultivating tools.

In accordance with the present invention, there is provided a multiple use cultivating tool which comprises a generally planar blade support having first and second surfaces; a handle support extending from the first surface; an elongated handle joined to the handle support; a first plurality of teeth extending from the blade support; a second plurality of teeth extending from the blade support; a straight edge extending from the blade support; and an elongated pick blade extending from the blade support.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 3 sets forth a perspective view of the present invention multiple use cultivating tool employed as a rake;

FIG. 4 sets forth a perspective view of the present invention multiple use cultivating tool employed as a hoe;

DESCRIPTION OF THE PREFERRED EMBODIMENT

Figure 1:
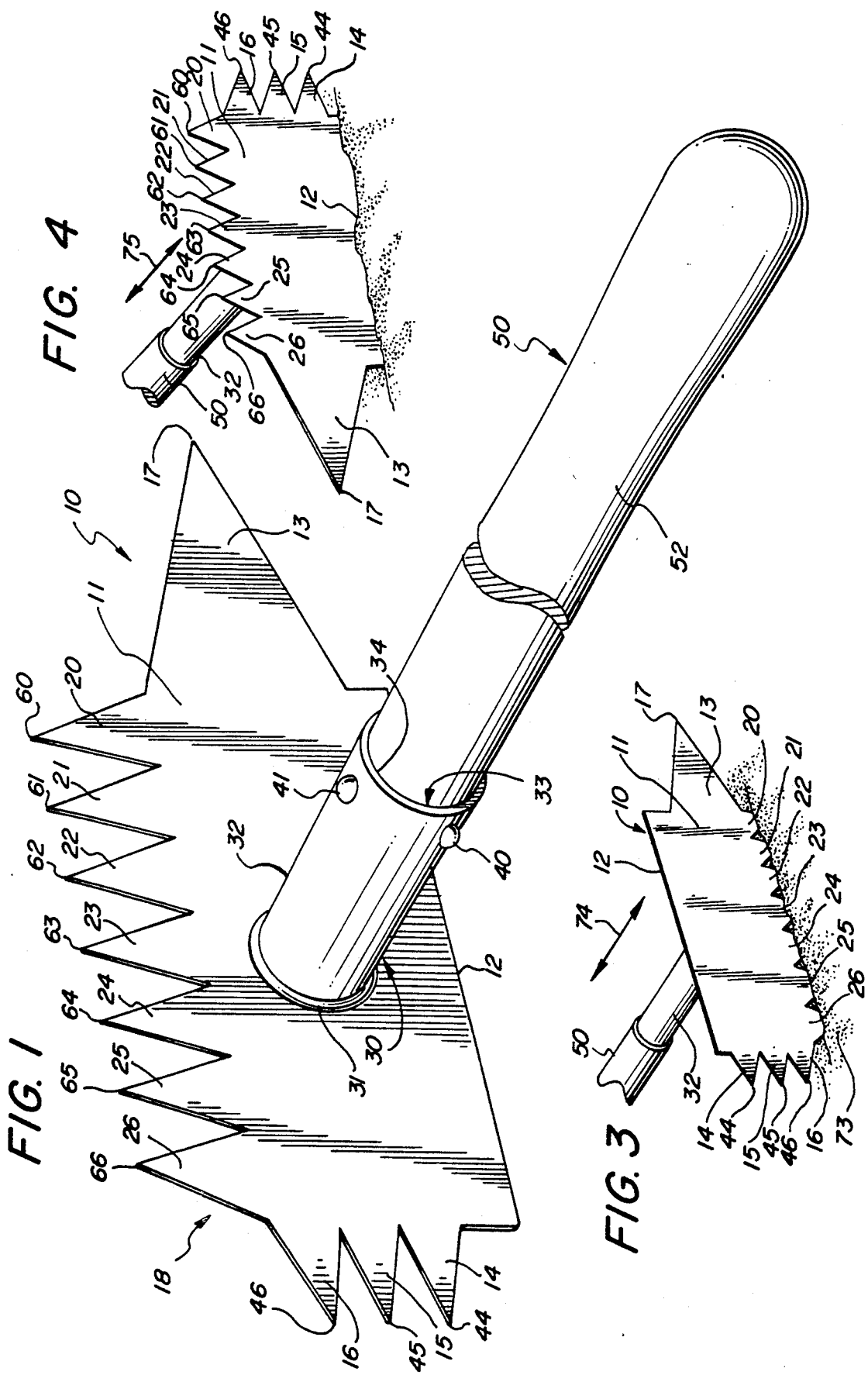
FIG. 1 sets forth a perspective view of a multiple use cultivating tool constructed in accordance with the present invention.

FIG. 1 sets forth a perspective view of a multiple use cultivating tool constructed in accordance with the present invention and generally referenced by numeral 10. Cultivating tool 10 includes a generally planar blade support 11 preferably formed of a rigid metal material such as steel. Blade support 11 further defines an elongated straight blade 12 and a generally triangular outwardly extending pick blade 13. Pick blade 13 terminates in a sharpened point 17. A plurality of rake teeth 14, 15 and 16 extend outwardly from blade support 11 in the opposite direction of pick blade 13. Rake teeth 14, 15 and 16 are generally triangular in shape and terminate in sharpened points 44, 45 and 46 respectively. A second plurality of rake teeth 20 through 26 extend outwardly from blade support 11 in the opposite direction of straight blade 12. Rake teeth 20 through 26 are generally triangular in shape and terminate in outwardly extending sharpened points 61 through 66 respectively. Straight blade 12, pick blade 13, rake teeth 14 through 16, and rake teeth 20 through 26 are generally coplanar with blade support 11. As a result, blade support 11 defines a planar tamping surface 18 on its outer side. A handle support 30 includes a generally cylindrical hollow member 32 defining an interior portion 33 (the latter seen in FIG. 2) and terminating in an outer edge 34. A weld seam 31 joins cylindrical member 32 to the interior surface of blade support 11 forming a rigid generally orthogonal attachment thereto. While in its preferred form seam 31 comprises a welded seam, it will be apparent to those skilled in the art that other methods of attachment may be utilized to secure blade support 11 to handle support 30 without departing from the spirit and scope of the present invention. As is better seen in FIG. 2, cylindrical member 32 defines a pair of opposed apertures 35 and 36.

An elongated handle 50 having a generally circular cross section and preferably formed of a strong wooden material defines a reduced cross section end portion 53 (better seen in FIG. 2) which is received within the interior of cylindrical member 32. A pair of fasteners 40 and 41 extend inwardly through apertures 35 and 36 respectively and into end portion 53 of handle 50 to secure handle 50 within handle support 30. Handle 50 defines a reduced section forming a grip portion 52 and a generally rounded end portion 51.

In accordance with the invention, cultivating tool 10 provides a single tool capable of a plurality of cultivating operations. For example, straight blade 12 permits tool 10 to function as a hoe and thereby provide the chopping or tilling operation and similar functions provided by a conventional hoe. Pick blade 13 extends outwardly from handle 50 and handle support 30 to provide an elongated sharp pick blade capable of use to be driven into the soil to break soil up and render it easier to manipulate. Rake teeth 14 through 16 provide a narrow rake tool suitable for use in restricted areas such as between rows of growing plants. Rake teeth 20 through 26 provide a rake tool suitable for use in more spacious environments to operate upon a broader soil area. Tamping surface 18 provides a planar surface which permits cultivating tool 10 to be utilized to tamp down or pack the soil when desired.

Thus, it will be apparent to those skilled in the art from examination of FIG. 1 and the descriptions which follow that cultivating tool 10 provides a plurality of beneficial uses including those of a hoe, pick, rake, ripper, chopper and tamper. It will be equally apparent to those skilled in the art that the variety of cultivating edges and surfaces provided by cultivating tool 10 permit additional uses of the present invention cultivating tool.

Figure 2:
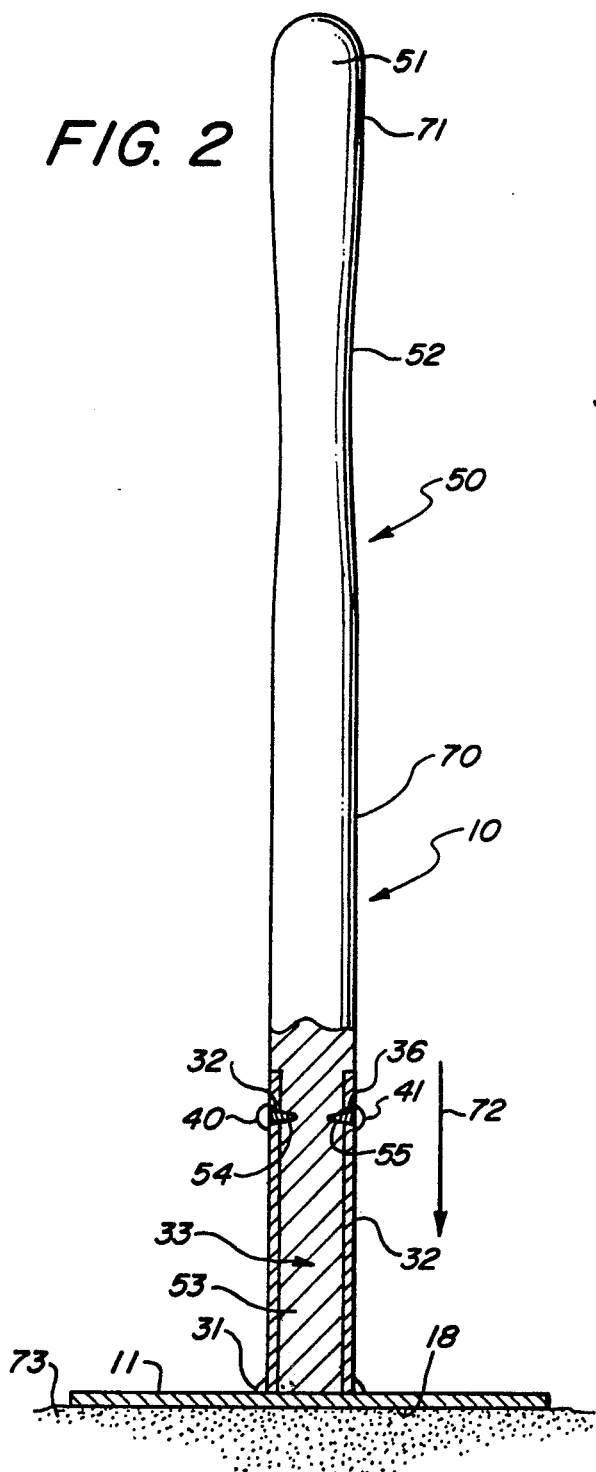
FIG. 2 sets forth a broken section view of the present invention multiple use cultivating tool.

FIG. 2 sets forth a section view of cultivating tool 10 in which blade support 11 and handle support 30 as well as a portion of handle 50 are shown in cross section. As described above, blade support 11 defines a generally planar member formed of a metal material and defining a planar tamping surface 18. A handle support 30 includes a generally cylindrical member 32 joined to blade support 11 in a perpendicular attachment by a weld seam 31. Cylindrical member 32 defines an interior 33 and a pair of apertures 35 and 36 as well as an outwardly extending edge 34. A handle 50 preferably formed of a strong wood material defines a generally circular cross section elongated member having a reduced end 53, a cylindrical portion 70, a reduced grip portion 52, an enlarged portion 71, and an end portion 51. End 53 is appropriately sized to snuggly fit within interior 33 of cylindrical member 32. A pair of fasteners 40 and 41 extend through apertures 35 and 36 respectively and include threaded portions 54 and 55 which are threaded into and engage end portion 53 of handle 50 to securely attach handle support 30 to handle 50. Cylindrical portion 70 of handle 50 is a generally constant cross section portion having an outer dimension generally conforming to the outer dimension of cylindrical member 32. Thus, the attachment of handle 50 to handle support 30 provides a generally flush continuous surface at edge 34. Handle 50 further defines a reduced cross section or tapered grip portion 52 and an enlarged portion 71. Grip portion 52 is suitable for aiding the user in maintaining grasp upon and control of cultivating tool 10. Enlarged portion 71 cooperates with reduced grip portion 52 to aid the user in grasping and manipulating cultivating tool 10. It will be apparent to those skilled in the art that blade support 11 and handle support 30 may be fabricated as a single molded or cast member without departing from the spirit and scope of the present invention. It will be equally apparent to those skilled in the art that additional support or strengthening in the form of ribs or webs extending between handle support 30 and blade support 11 may be utilized to strengthen the overall structure of blade support 11 and handle support 30. It will be equally apparent to those skilled in the art that in certain situations blade support 11 and handle support 30 may be fabricated from nonmetal materials such as reinforced molded materials or the like.

Further examination of FIG. 2 shows that cultivating tool 10 is positioned above a portion of soil 73 such that handle 50 extends vertically and tamping surface 18 extends generally horizontally. When so positioned, the downward thrust of cultivating tool 10 in the direction indicated by arrow 72 drives tamping surface 18 against soil 73 and due to the force applied and the weight of cultivating tool 10 provides substantial packing or compacting of soil 73. This operation may be repeatably performed in which tool 10 is raised by grasping handle 50 and driven downwardly in the direction of arrow 72 to further compact soil 73. Thus, FIG. 2 shows the present invention cultivating tool used as a tamper or soil packing device.

FIG. 3 sets forth a cultivating tool utilized to provide the function of a broad rake cultivating tool. It will be apparent from examination of FIGS. 1 and 3 that cultivating tool 10 has been reoriented in FIG. 3 to cause rake teeth 20 through 26 to extend downwardly in a general horizontal array. Thus, teeth 20 through 26 inclusive are shown penetrating soil 73 to provide soil cultivation. In the reoriented position, teeth 14 through 16 extend horizontally as does pick blade 13. Oppositely facing straight blade 12 extends upwardly and does not engage soil 73. In the position shown in FIG. 3, the user grasps handle 50 and raises end 51 (seen in FIG. 1) until the desired angle of handle 50 and handle support 32 is achieved whereby the angle of engagement of teeth 20 through 26 with soil 73 is obtained. Thereafter, handle 50 is moved laterally to provide back and forth motion in the directions indicated by arrows 74 to drive teeth 20 through 26 through soil 73 and achieve a raking action. It should be noted that when so used in the manner shown in FIG. 3, only teeth 20 through 26 engage soil 73 and the remainder of cultivating members of tool 10 remain removed from soil 73.

FIG. 4 sets forth cultivating tool 10 reoriented to utilize straight blade 12 upon soil 73. As can be seen, the position of cultivating tool 10 in FIG. 4 is the reverse orientation of that shown in FIG. 3. Thus teeth 20 through 26 extend upwardly away from soil 73 while straight blade 12 is driven into soil 73 in the manner in which a hoe is utilized. In accordance with the reorientation of tool 10, pick blade 13 extends to the right in FIG. 4 while teeth 14 through 16 extend to the left. Once again, the user raises or lowers handle 50 to achieve the desired angle between blade 11 and soil 73 to provide the desired cultivating action. Thereafter, for example, the user may move cultivating tool 10 back and forth in the direction indicated by arrows 75 to achieve manipulation of soil 73. In addition, it will be apparent to those skilled in the art that straight blade 12 may also be used in a manner providing chopping motion of handle 50 in which case straight blade 12 provides a chopping or breaking action of soil 73.

Figure 5:
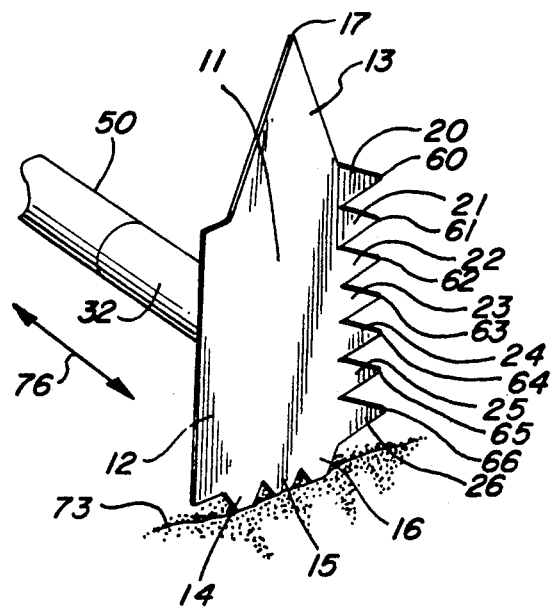
FIG. 5 sets forth a perspective view of the present invention multiple use cultivating tool employed as a narrow rake.

FIG. 5 sets forth still an additional orientation of cultivating tool 10 in which tool 10 is rotated to cause rake teeth 14 through 16 to extend downwardly into soil 73 while pick blade 13 extends upwardly therefrom. As can be seen in the position shown in FIG. 5, rake teeth 20 through 26 extend to the left while straight blade 12 extends to the right. As mentioned above, one of the most frequent uses for cultivating tool 10 in the orientation shown in FIG. 5 is to provide the soil working function of a narrow rake or similar cultivating tool in situations of restricted space such as that found between rows of growing plants. Once again, handle 50 is raised by the user to the desired angle to produce the desired inclination between blade 11 and soil 73. Thereafter, cultivating tool 10 may be moved back and forth in the direction indicated by arrow 76 to provide raking of soil 73. In addition, it will be apparent to those skilled in the art that cultivating tool 10 may be utilized in the orientation shown in FIG. 5 in a chopping or soil breaking operation and to chop through roots, undergrowth and weeds.

Figure 6:
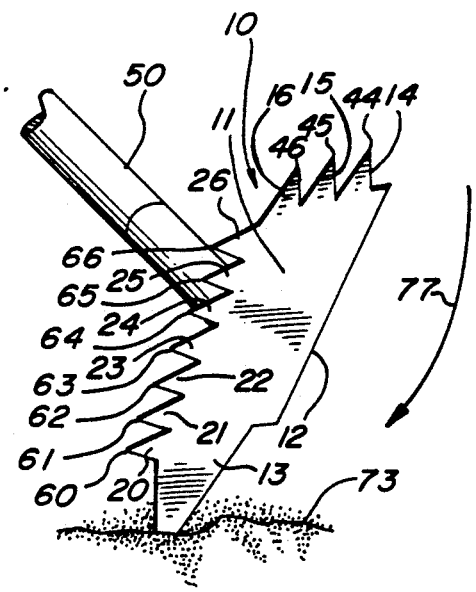
FIG. 6 sets forth a perspective view of the present invention multiple use cultivating tool employed as a pick.

FIG. 6 sets forth a still further orientation of the present invention cultivating tool in which the desire is to provide a function similar to a pick. As such, cultivating tool 10 is shown in FIG. 6 reoriented such that pick blade 13 extends downwardly toward soil 73. Accordingly, straight blade 12 extends to the left in FIG. 6 while rake teeth 20 through 26 extend to the right and teeth 14 through 16 extend upwardly. In the use shown in FIG. 6, handle 50 is manipulated in a chopping motion whereby blade 11 is driven downwardly in an arched or curved path indicated by arrow 77 to drive point 17 and pick blade 13 into soil 73. This action provides a deep chopping or cultivating operation similar to that provided by a conventional pick or pickax.

What has been shown is a multiple use cultivating tool which provides a plurality of cultivating operations in a single tool and avoids the use of a substantial array of tools in soil cultivation operations. The tool shown is rigidly constructed and may be manufactured using relatively inexpensive manufacturing techniques. In addition, a variety of materials may be utilized to fabricate the present invention multiple use cultivating tool.

While particular embodiments of the invention have been shown and described, it will be obvious to those skilled in the art that changes and modifications may be made without departing from the invention in its broader aspects. Therefore the aim in the appended claims is to cover all such changes and modifications as fall within the true spirit and scope of the invention.

That which is claimed is:

1. A multiple use cultivating tool comprising:
   a generally planar tool head having first and second surfaces said second surface having a flat generally rectangular-shaped tamping surface free of protrusions extending over a majority of said second surface;
   a handle support extending from said first surface;
   an elongated handle joined to said handle support;
   a first plurality of teeth extending from a first side of said tool head;
   a second plurality of teeth extending from a third side of said tool head;
   a straight edge portion extending from a fourth side of said tool head; and
   an elongated pick blade extending from a second side of said tool head,
   said tamping surface, said first plurality of teeth, said second plurality of teeth, said straight edge portion and said pick blade being coplanar.

2. A cultivating tool as set forth in claim 1 wherein said first and second pluralities of teeth form first and second generally parallel arrays respectively.

3. A cultivating tool as set forth in claim 2 wherein said tool head is elongated and wherein said first and second sides are shorter than said third and fourth sides.

4. A cultivating tool as set forth in claim 3 wherein said first and second pluralities of teeth, said pick blade, said straight edge portion, and said tool head are formed of a single integral piece of rigid material.

5. A cultivating tool as set forth in claim 4 wherein said pick blade is generally triangular shaped.

6. A cultivating tool as set forth in claim 5 wherein said first and second pluralities of teeth are generally triangular shaped teeth.

7. A cultivating tool as set forth in claim 1 wherein said handle support is generally cylindrical and defines an interior passage.

8. A cultivating tool as set forth in claim 7 wherein said elongated handle defines a generally circular cross section and defines a generally cylindrical end portion received within said interior passage.

9. A cultivating tool as set forth in claim 8 wherein said handle support is generally perpendicular to said first surface of said tool head.

* * * * *